(12) United States Patent
Fu et al.

(10) Patent No.: US 7,830,825 B2
(45) Date of Patent: Nov. 9, 2010

(54) METHOD FOR REALIZING THE MULTICAST SERVICE

(75) Inventors: Yan Fu, Guangdong (CN); Haitao Hu, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 313 days.

(21) Appl. No.: 10/590,375

(22) PCT Filed: Mar. 24, 2005

(86) PCT No.: PCT/CN2005/000375

§ 371 (c)(1),
(2), (4) Date: May 16, 2007

(87) PCT Pub. No.: WO2005/091562

PCT Pub. Date: Sep. 29, 2005

(65) Prior Publication Data

US 2007/0253409 A1  Nov. 1, 2007

(30) Foreign Application Priority Data

Mar. 24, 2004  (CN) .................. 2004 1 0030392

(51) Int. Cl.
 *H04H 20/71* (2008.01)
(52) U.S. Cl. .................. 370/312; 370/390; 370/473
(58) Field of Classification Search .................. 370/230, 370/252, 253, 310, 360, 389, 390, 392, 395.1, 370/395.21, 395.31, 395.52, 395.53, 400, 370/408, 420, 471, 473, 474, 475
See application file for complete search history.

(56) References Cited

U.S. PATENT DOCUMENTS 5,956,716 A * 9/1999 Kenner et al. .................. 707/10

(Continued)

FOREIGN PATENT DOCUMENTS

CN  1419363 A  5/2003

(Continued)

OTHER PUBLICATIONS

"A JINI/JAVA based streaming framework for group communication" Networks, 2002. ICON 2002. 10th IEEE International Conference on Aug. 27-30, 2002, Piscataway, NJ, USA, IEEE, Aug. 27, 2002, pp. 139-144, XP010603609 ISBN: 0-7803-7533-5.

(Continued)

*Primary Examiner*—Aung S Moe
*Assistant Examiner*—Benjamin Elliott

(57) ABSTRACT

The present invention discloses a method for implementing multicast services, which includes: preset a mapping relation between a multicast user address and a multicast group address; acquire a request packet sent by the multicast user who requests to join in the multicast group; determine whether the multicast group address in request packet is the same as that corresponding to the multicast user in the established mapping relation according to the multicast user address and multicast group address carried in the request packet. If yes, allow the multicast user to join in the multicast group. Otherwise, prohibit the multicast user from joining in the multicast group. The present invention can open the preset multicast resources to the preset multicast user with speed and pertinence. At the same time, it limits the maximum number of multicast groups that each multicast user is allowed to join in, which can effectively control multicast service bandwidth and further protect the network equipment.

18 Claims, 2 Drawing Sheets

U.S. PATENT DOCUMENTS

| | | | | |
|---|---|---|---|---|
| 5,959,989 | A * | 9/1999 | Gleeson et al. | 370/390 |
| 6,330,238 | B1 * | 12/2001 | Ooe | 370/390 |
| 6,400,715 | B1 * | 6/2002 | Beaudoin et al. | 370/392 |
| 6,567,851 | B1 * | 5/2003 | Kobayashi | 709/228 |
| 6,683,887 | B1 * | 1/2004 | Huang et al. | 370/466 |
| 6,839,348 | B2 * | 1/2005 | Tang et al. | 370/390 |
| 6,847,638 | B1 * | 1/2005 | Wu et al. | 370/389 |
| 7,200,865 | B1 * | 4/2007 | Roscoe et al. | 726/12 |
| 7,305,010 | B2 * | 12/2007 | Hayashi et al. | 370/473 |
| 7,307,945 | B2 * | 12/2007 | Gerdisch et al. | 370/217 |
| 7,545,735 | B1 * | 6/2009 | Shabtay et al. | 370/217 |
| 2001/0023487 | A1 * | 9/2001 | Kawamoto | 713/202 |
| 2003/0073453 | A1 * | 4/2003 | Basilier | 455/503 |
| 2003/0134622 | A1 * | 7/2003 | Hsu et al. | 455/414 |
| 2003/0147392 | A1 * | 8/2003 | Hayashi et al. | 370/390 |
| 2003/0157933 | A1 * | 8/2003 | Watanabe et al. | 455/435 |
| 2003/0165140 | A1 * | 9/2003 | Tang et al. | 370/393 |
| 2003/0231629 | A1 * | 12/2003 | Banerjee et al. | 370/390 |
| 2004/0172559 | A1 * | 9/2004 | Luo et al. | 713/201 |
| 2005/0091313 | A1 * | 4/2005 | Zhou et al. | 709/204 |
| 2007/0115975 | A1 * | 5/2007 | Zhang | 370/390 |
| 2007/0253409 | A1 * | 11/2007 | Fu et al. | 370/389 |
| 2008/0010666 | A1 * | 1/2008 | Cheng et al. | 726/1 |
| 2010/0111529 | A1 * | 5/2010 | Zeng et al. | 398/58 |

FOREIGN PATENT DOCUMENTS

| | | |
|---|---|---|
| EP | 0142480 A2 | 5/1985 |
| EP | 1357720 | 10/2003 |
| EP | 1357720 A1 * | 10/2003 |
| EP | 1480405 | 11/2004 |
| EP | 1480405 A1 * | 11/2004 |
| WO | WO-2003/065677 | 8/2003 |

OTHER PUBLICATIONS

Notice of Opposition to a European patent EP1715628 dated Apr. 2, 2009.

J Wang et al.; "IGMP snooping: A VLAN-Based multicast protocol". HSNMC 2002; 5th IEEE International Conference on High Speed Networks and Multimedia Communications, held in Jeju, Korea, Jul. 3-5, 2002, posted online Nov. 7, 2002.

IEFT RFC 3376; Internet Group Management Protocol, Version 3, published Oct. 2002.

Indian Office Action for Indian Patent Application No. 3063/CHENP/2006.

English translation of the Written Opinion of the International Searching Authority of International Application No. PCT/CN2005/000375, dated Jun. 27, 2005.

Filed Response to European Notice of Opposition for European Patent No. 1715628, dated Dec. 4, 2009.

* cited by examiner

METHOD FOR REALIZING THE MULTICAST SERVICE

FIELD OF THE TECHNOLOGY

The present invention relates in general to network communication techniques, and more particularly to a method for implementing multicast services.

BACKGROUND OF THE INVENTION

With the development of multimedia services such as media streaming, video conference, and video on demand, multicast services have become an important service on the Internet. The multicast service operators are paying more and more attention to such problems as how to efficiently manage multicast users and multicast resources (namely multicast sources) while implementing multicast services, so as to make multicast services diversified and to make multicast users and multicast resources more manageable.

There are three methods for implementing multicast services at present:

For the first method, a router establishes a multicast group address forwarding table in a layer-3 network equipment by using an Internet Group Management Protocol (IGMP); when a multicast user joins in a multicast group, the router adds the multicast user's forwarding information to the multicast group address forwarding table and deletes the multicast user's forwarding information from the multicast group address forwarding table when the multicast user leaves the multicast group, so as to dynamically manage the multicast user to join or leave the multicast group. Therefore, the multicast services implemented only through the IGMP can only obtain statuses of the multicast user's joining and leaving the multicast group, and not provide management over whether the multicast user is authorized to join in the multicast group, which is unfavorable to the multiple developments of multicast network operator's services.

The second method is to utilize IGMP Snooping techniques to snoop the IGMP packet transferred between multicast users and the layer-3 network equipment, like the router and so on, establish and maintain a layer-2 multicast group address forwarding table in a layer-2 network equipment according to types of IGMP packets, and implement multicast services according to the layer-2 multicast group address forwarding table and the layer-3 multicast group address forwarding table.

As shown in FIG. 1, the multicast user actively initiates an IGMP leaving packet before leaving the multicast group, so as to notify the router to delete the multicast user's address from the layer-3 multicast group address forwarding table; the multicast user initiates an IGMP joining packet before joining in the multicast group, so as to notify the router to add the multicast user's address to the layer-3 multicast group address forwarding table; while the router is confirming the multicast user's state by sending an IGMP inquiry packet to the multicast user, if the router fails to receive any inquiry response in a certain period of time, it will delete the multicast user's address from the layer-3 multicast group address forwarding table. If the multicast user responds an IGMP report packet to the router after receiving the IGMP inquiry packet, the router will decide whether to add the multicast user to the multicast group or establish a new layer-3 multicast group address forwarding table according to the multicast group information carried in the IGMP report packet.

IGMP Proxy is similar to IGMP Snooping, but IGMP Proxy terminates the IGMP packets from multicast users and requests upper layer network equipment for multicast recourses as a proxy of the multicast user.

Either IGMP Snooping technique or IGMP Proxy technique just simply implements IGMP protocol, data duplication and forwarding. Both of them lack such management as whether the multicast user is authorized to join in the multicast group. The result is that any multicast user can join in any multicast group, which is unfavorable to the multiple developments of multicast network operator's services.

The third method is to implement multicast services through Access Control List (ACL) on the basis of IGMP Snooping or IGMP Proxy. This method includes:

Firstly, ACL is preset for multicast users who are authorized to use multicast services. For instance, address information 10.10.10.10/24 is set in ACL, and the multicast user whose source IP address is 10.10.10.10/24 can access any multicast group. Secondly, the layer-2 network equipment processes the IGMP packet sent by the multicast user by IGMP Snooping technique or IGMP Proxy technique and compares the multicast user's source IP address with the address in ACL. If the multicast user's source IP address matches the address in the ACL, the multicast user is authorized to join in any multicast group; if the user's source IP address doesn't match the address in the ACL, the multicast user is prohibited from joining any multicast group.

SUMMARY OF THE INVENTION

In the above method, the multicast users are managed to a certain extent while multicast services are implemented, but there is no limitation as to which special multicast group the user can join in. If the multicast service operator provides or purchases some special multicast group resources and only desires to open them to special multicast users, this method is unable to satisfy such requirement.

Therefore, the present invention provides a method for implementing multicast services, so that multicast users and multicast resources can be effectively managed and make multicast services diversified.

The method for implementing multicast service includes:

A. a mapping relation between a multicast user address and a multicast group address is preset;

B. a request packet sent by the multicast user who requests to join in the multicast group is obtained; according to the multicast user address and multicast group address carried in the request packet, it is determined whether the multicast group address in the request packet matches corresponding multicast group address of the multicast user among the mapping relation preset in step A, if yes, the multicast user is permitted to join in the multicast group, otherwise, the multicast user is rejected prohibited from joining in the multicast group.

Step A further includes, a mapping relation between the multicast user address and a multicast authority is established, and a mapping relation between the multicast authority and the multicast group addresses is established.

The step of determining whether the multicast group address in the request packet matches the corresponding multicast group address of the multicast user among the mapping relation preset in step A, further includes: it is determined whether the multicast group address in the request packet corresponds to the multicast authority; if yes, whether the multicast group address in the request packet matches that corresponding to the multicast authority is determined; if yes, the multicast user is permitted to join in the multicast group, otherwise the multicast user is prohibited from joining in the multicast group; if the multicast group address in the request packet corresponds to no multicast authority, the multicast user is prohibited from joining in the multicast group.

If the multicast group address in the request packet corresponds to no multicast authority in step B, whether the multicast user is a super user is determined; if yes, the multicast user is permitted to join in the multicast group, otherwise the multicast user is prohibited from joining in the multicast group.

The mapping relation between the multicast user address and multicast group address is one-to-many.

The mapping relation between the multicast user address and the multicast authority are one-to-many or many-to-one, the mapping relation between multicast group addresses and multicast authorities are one-to-many or many-to-one.

The multicast user address includes a frame number, a slot number and a port number of a layer-2 network equipment to which the multicast user is connected; or the multicast user address includes a frame number, a slot number, a port number, a Virtual LAN (VLAN) identifier and an IP address of a layer-3 network equipment to which the multicast user is connected.

The layer-2 network equipment is Digital Subscriber Line (DSL) broadband access equipment or a Local Area Network (LAN) switcher; the layer-3 network equipment is a router or a layer-3 switcher.

The request packet sent by the multicast user who requests to join in the multicast group is obtained through snooping the request packet via an Internet Group Management Protocol (IGMP).

The request packet sent by the multicast user who requests to join in the multicast group is obtained as follows: an IGMP Proxy terminates the request packet and requests upper-level layer network equipment for multicast resources as a proxy of the multicast user.

The request packet is based on the IGMP.

By establishing mapping relations among multicast users, multicast authorities, multicast group addresses namely multicast programs, preset multicast resources can be opened to preset multicast users with speed and pertinence. Meanwhile, by establishing the above-mentioned mapping relations, a multicast user is limited to use a maximum number of allowed multicast services, thus the multicast service bandwidth is effectively controlled and network equipment is effectively protected. The technical scheme of the present invention also makes multicast users and multicast resources manageable and operational, and finally implements diversified multicast services.

DETAILED DESCRIPTION OF THE INVENTION

Figure 1:
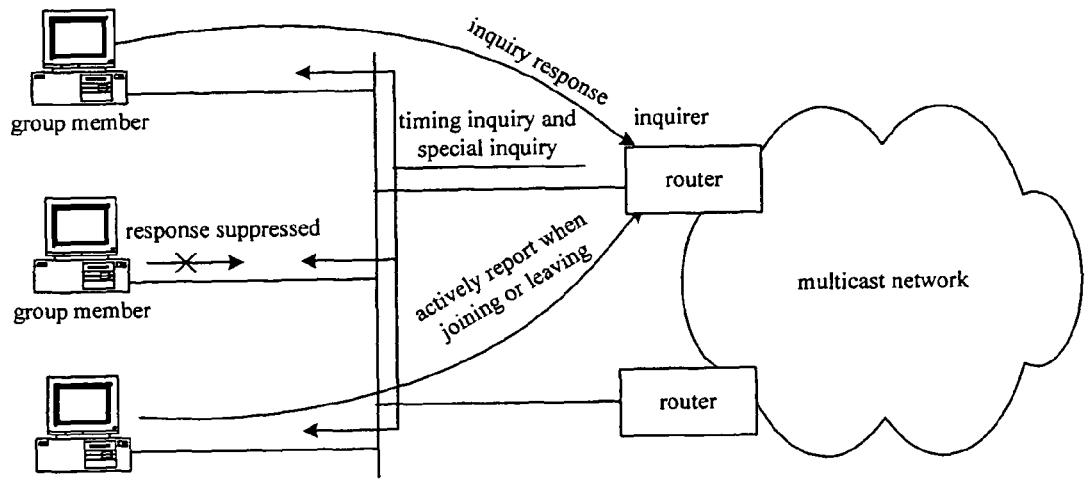
FIG. 1 is a schematic diagram illustrating a bandwidth access network.

The present invention will be described in detail hereinafter with reference to the accompanying drawings.

The method of an embodiment in the present invention includes: presetting a mapping relation between multicast users and multicast addresses; when the multicast user requests to use multicast services by sending a request packet, utilizing the multicast service according to a matching result between the multicast group address carried in the request packet and the multicast group address in the preset mapping relation.

Multicast group address refers to a multicast program or multicast source. Each multicast group address provides one multicast program, in other words, one multicast program is essentially one information stream of the multicast source sent from one multicast group address.

Definition of the multicast user depends on specific location information of the connection between the multicast user and the network equipment; as to the network equipment, location information can be taken as address information of the multicast user. For instance, as to the layer-2 network equipment such as a Digital Subscriber Line (DSL) broadband access equipment, and a LAN SWITCH, the frame number, slot number and port number of the layer-2 network equipment can be taken as address information of a multicast user because multicast users can be identified according to the frame number, slot number and port number of the connected equipment; as to the layer-3 network equipment like the router, the frame number, slot number, port number, VLAN ID and IP address of the level-3 network equipment can be taken as address information of a multicast user because multicast users can be identified according to the frame number, slot number, port number and VLAN ID of the connected equipment. It should be specially mentioned that, when a plurality of multicast users are connected to the layer-2 network equipment that is connected to a certain frame, slot, or port of the layer-3 network equipment, it must be guaranteed that each multicast user uses a unique VLAN ID.

Since there are a number of multicast group addresses as well as a number of multicast users, some multicast group addresses can be accessed by all multicast users while some multicast group addresses can only be accessed by specific multicast users. In order to manage the variational multicast users and multicast group addresses better, the preferable way is to establish the mapping relation between multicast users and multicast addresses by setting multicast authorities, namely respectively establishing mapping relations between multicast addresses and multicast authorities as well as mapping relations between multicast authorities and multicast users, and some other properties can be set in the multicast authority, such as time limitation of multicast program that can be obtained by the multicast user. These mapping relations can be stored in the layer-3 network equipment or the layer-2 network equipment.

Each multicast authority corresponds to at least one multicast program; each multicast program that needs multicast resource management corresponds to at least one multicast authority, and the mapping relations between the multicast authorities and multicast programs are one-to-many or many-to-one. The multicast user to be managed should correspond to at least one multicast authority. If the multicast user does not correspond to any multicast authority, the multicast user is a super user and can join in any multicast group. Each multicast user to be managed at least corresponds to one multicast authority, and the mapping relations between the multicast user addresses and multicast authorities are one-to-many or many-to-one.

Since the mapping relation between multicast group addresses and multicast authorities is one-to-many or many-to-one, and so is the mapping relation between multicast authorities and multicast users, the multicast user is allowed to have different multicast authorities.

For instance, the multicast network operator can set all literature and art programs in multicast authority 1 and all drama programs in multicast authority 2; or set all literature and art programs as well as all news programs in multicast authority 3; according to management requirement of the multicast users, the multicast network operator can set as follows: multicast user 1 has multicast authority 1 and multicast authority 2, multicast user 2 has multicast authority 2 while multicast user 3 has multicast authority 2 and multicast authority 3, so that multicast user 1 can access all literature and art programs as well as all drama programs, multicast user 2 can access all drama programs, multicast user 3 can access all drama programs, all literature and art programs as well as all news programs.

Figure 2:
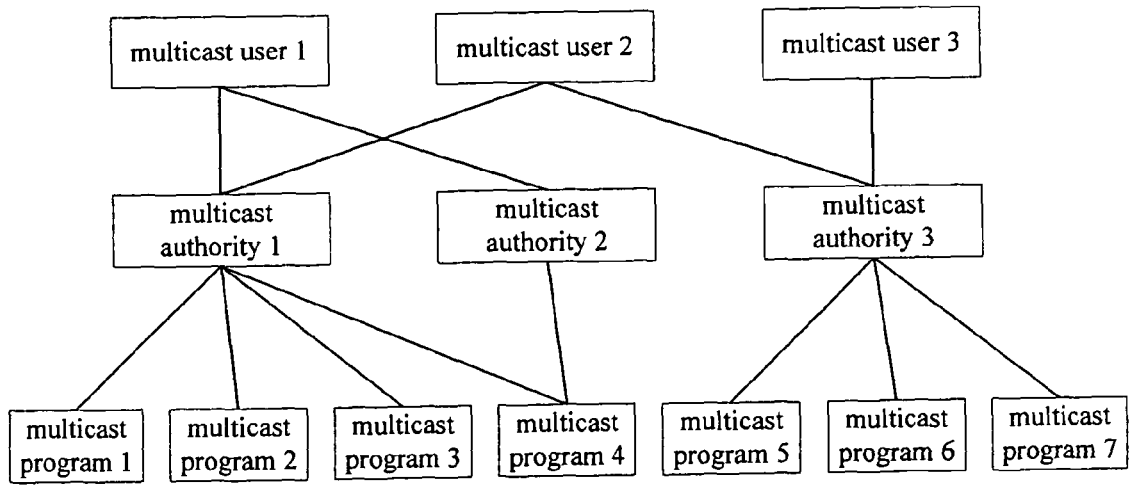
FIG. 2 is a schematic diagram illustrating mapping relations among multicast users, multicast authorities and multicast programs.

FIG. 2 is a schematic diagram illustrating mapping relations among multicast users, multicast authorities and multicast programs. Mapping relations between multicast user 1 and multicast authority 1 and 2 are one-to-many, so are the mapping relations between multicast user 2 and multicast authority 1 and 3. Mapping relations between multicast user 1 as well as multicast user 2 and multicast authority 1 is many-to-one, and so is the mapping relation between multicast user 2 as well as multicast user 3 and multicast authority 3. Mapping relations between multicast authority 1 and multicast program 1, multicast program 2, multicast program 3 and multicast program 4 are one-to-many. Mapping relations between multicast authority 3 and multicast program 5, multicast program 6 and multicast program 7 are one-to-many. Mapping relations between multicast authority 1 as well as multicast authority 2 and multicast program 4 is many-to-one.

Based on the above setting, when the multicast user joins in a certain multicast group to utilize the multicast services, the multicast user should be processed according to the above setting. The specific method is: when the multicast user wants to join in a certain multicast group to utilize the multicast services, the multicast user sends a request packet that includes an IGMP-based request packet. The layer-2 network equipment or layer-3 network equipment can obtain the request packet sent by the multicast user by way of IGMP Proxy technique or IGMP Snooping technique. After obtaining the request packet, the network equipment can determine whether the multicast user is authorized to utilize the multicast service according to information carried in the request packet.

Figure 3:
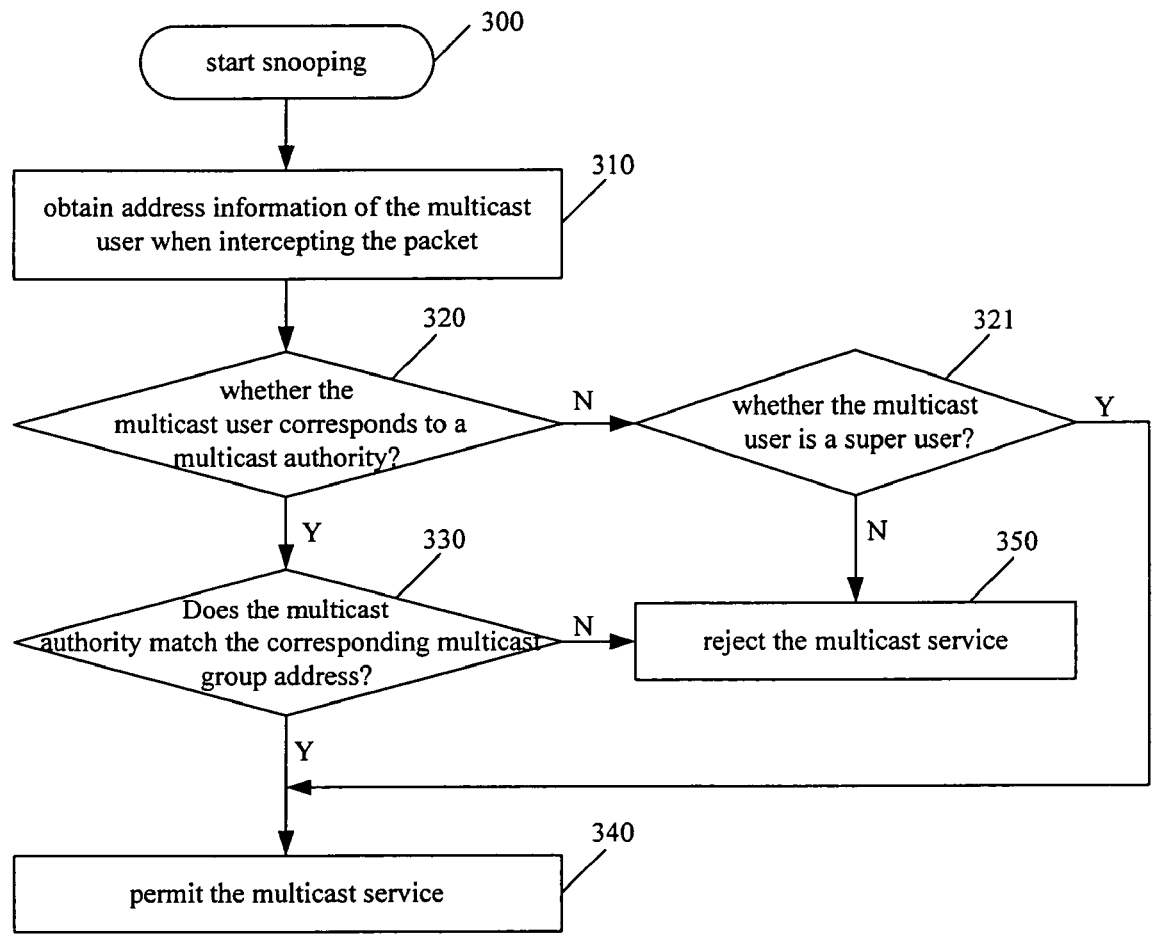
FIG. 3 is a flowchart illustrating the method for implementing multicast services according to an embodiment of the present invention.

Subsequent processes after snooping the request packet will be illustrated hereinafter with reference to the accompanying FIG. 3.

Step 300: the layer-2/layer-3 network equipment utilizes IGMP Proxy technique or IGMP Snooping technique to snoop the IGMP-based request packet sent by the multicast user; when the IGMP-based request packet sent by the multicast user is snooped, execute step 310; determine the multicast user's address information according to the VLAN ID carried in this request packet and/or the frame number, slot number, port number and IP address from which the request packet is sent.

Step 320: determine whether the multicast user corresponds to a multicast authority according to the mapping relation between address information of the multicast users and multicast authorities. If this multicast user does not correspond to any multicast authority, execute step 321 to determine whether the multicast user is a super user according to the multicast user's address information carried in the request packet; if the multicast user is a super user, execute step 340 to permit the user's using the requested multicast service, namely, adding the multicast user to the multicast address forwarding list and forwarding the multicast service stream according to the forwarding list. If the multicast user is not a super user according to the multicast user's address information carried in the request packet, execute step 350 to prohibit the multicast user from using the current requested service, namely prohibit adding the multicast user to the multicast address forwarding list, so that the multicast service stream will not be forwarded to the multicast user because the multicast user information is not included in the forwarding list.

In step 320, if it is determined that the multicast user corresponds to a multicast authority according to the mapping relation between the multicast user's address information and multicast authorities, execute step 330. Determine whether the multicast group address carried in the request packet matches' the multicast group address in the mapping relation according to the mapping relation between multicast authorities and multicast group addresses; if yes, execute step 340 to permit the multicast user to use the current requested multicast service; otherwise, execute step 350 to prohibit the multicast user from using the current requested multicast service.

In the embodiment of the present invention, while managing multicast users and multicast resources, relevant information concerning a multicast user's joining a certain multicast group can be obtained. For instance, a multicast user demands a certain multicast program at a certain time point, the multicast user cuts off this multicast program at a certain time point. According to the relevant information, the data like the multicast user's viewing time slice, viewing time span and viewing ratio can be accurately calculated, which is in favor of multicast network operator's operation.

While the present invention has been described with reference to preferable embodiments, it will be understood by those skilled in the art that various changes may be made and equivalents may be substituted without departing from the scope of the present invention, and hopefully the accompanied claims will comprise these variations and changes.

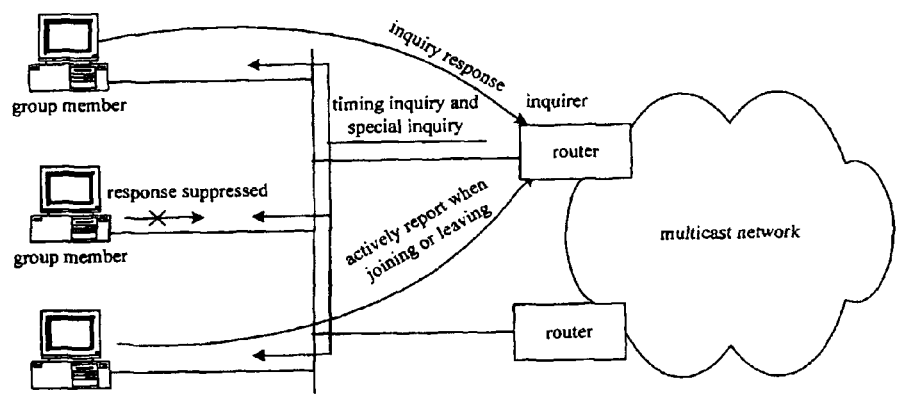

The invention claimed is:

1. A method for implementing multicast services, comprising:

presetting a first mapping relation between address information of multicast users and multicast authorities and a second mapping relation between multicast authorities and multicast group addresses in a network equipment, wherein the first mapping relation between address information of multicast users and multicast authorities defines that at least one multicast user corresponds to different multicast authorities and that at least one multicast authority corresponding each corresponds to many multicast users, wherein the second mapping relation between multicast authorities and multicast group addresses defines that at least one multicast authority corresponds to a plurality of multicast programs which can be accessed by at least one multicast user;

obtaining a request packet sent by a given multicast user who requests to join in a multicast group to use a multicast service;

determining address information of the given multicast user according to a Virtual Local Area Network identifier (VLAN ID) carried in the request packet and/or a frame number, slot number and port number of the network equipment to which the given multicast user is connected;

using the address information of the given multicast user to determine whether the given multicast user corresponds to a multicast authority according to the first mapping relation;

determining whether a multicast group address carried in the request packet matches a multicast group address corresponding to the multicast authority of the given multicast user according to the second mapping relation;

if the given multicast user corresponds to a multicast authority and the multicast group address carried in the request packet matches a multicast group address corresponding to the multicast authority of the given multicast user, permitting the given multicast user to use the requested multicast service, otherwise, prohibiting the given multicast user from using the request multicast service.

2. The method according to claim 1, wherein the step of determining that the multicast user does not correspond to any multicast authority, further comprises:

determining whether the multicast user is a super user, if yes, permitting the multicast user to join in the multicast group, otherwise prohibiting the multicast user from joining in the multicast group.

3. The method according to claim 1, wherein, the address information of the multicast user is a frame number, a slot number and a port number of a layer-2 network equipment to which the multicast user is connected; or a frame number, a slot number, a port number, a Virtual LAN identifier (VLAN ID), and an IP address of a layer-3 network equipment to which the multicast user is connected.

4. The method according to claim 3, wherein, the layer-2 network equipment is a Digital Subscriber Line (DSL) broadband access equipment or a Local Area Network (LAN) switch;

the layer-3 network equipment is a router or a layer-3 switch.

5. The method according to claim 1, wherein, the step of obtaining the request packet sent by the multicast user who requests to join in the multicast group comprises:

snooping the request packet by using an Internet Group Management Protocol (IGMP) technique.

6. The method according to claim 1, wherein, the step of obtaining the request packet sent by the multicast user who requests to join in the multicast group comprises:

an IGMP Proxy terminating the request packet and requesting upper-layer network equipment for multicast recourses as a proxy of the multicast user.

7. The method according to claim 1, wherein, the request packet is based on IGMP.

8. The method according to claim 1, wherein the plurality of multicast programs are programs in a certain program category, the certain program category including at least one of news, drama, art, and literature.

9. A method for implementing multicast services, comprising:

presetting mapping relations among multicast users, multicast authorities and multicast programs that each refers to a multicast group address in a network equipment, wherein the step of presetting mapping relations comprises presetting a first mapping relation between multicast programs and multicast authorities, the first mapping relation defining that each multicast authority corresponds to at least one multicast program and a plurality of multicast programs are set in one multicast authority, wherein the step of presetting mapping relations comprises presetting a second mapping relation between multicast authorities and multicast users, the second mapping relation defining that at least one multicast user corresponds to different multicast authorities and that at least one multicast authority each corresponds to many multicast users, each multicast user being identified according to address information of the each multicast user depending on location information of a connection between the each multicast user and the network equipment;

obtaining a request packet carrying a multicast group address from a given multicast user who requests to join in a multicast group to utilize a multicast service by way of an Internet Group Management Protocol (IGMP) Snooping technique or IGMP Proxy technique;

determining address information of the given multicast user according to the request packet, the address information of the given multicast user depending on location information of a connection between the given multicast user and the network equipment;

determining whether the given multicast user corresponds to a multicast authority according to the second mapping relation;

determining whether the multicast group address carried in the request packet matches a multicast group address corresponding to the determined multicast authority of the given multicast user according to the mapping relations;

if the multicast group address carried in the request packet matches a multicast group address corresponding to the determined multicast authority of the given multicast user, permitting the given multicast user to use the requested multicast service;

if the multicast group address carried in the request packet does not match a multicast group address corresponding to the determined multicast authority, prohibiting the given multicast user from using the requested multicast service.

10. The method according to claim 9, wherein the step of determining address information of the multicast user comprises: determining the location information of the multicast user according to a frame number, slot number and port number of the network equipment.

11. The method according to claim 10, wherein the network equipment is a layer-2 network equipment to which the multicast user is connected, and the step of determining the location information of the multicast user according to a frame number, slot number and port number of the network equipment comprises: determining the address information of the multicast user according to a frame number, a slot number and a port number of a layer-2 network equipment to which the multicast user is connected.

12. The method according to claim 10, wherein the network equipment is a layer-3 network equipment to which the multicast user is connected, and the step of determining the location information of the multicast user according to a frame number, slot number and port number of the network equipment comprises:

determining the location information of the multicast user according to a frame number, a slot number, a port number, a Virtual LAN identifier (VLAN ID), and an IP address of a layer-3 network equipment to which the multicast user is connected.

13. The method according to claim 9, if determining that the multicast user does not correspond to any multicast authority, further comprising:

determining whether the multicast user is a super user, if yes, permitting the multicast user to join in the multicast group, otherwise prohibiting the multicast user from joining in the multicast group.

14. The method according to claim 9, wherein the plurality of multicast programs are programs in a certain program category, the certain program category including at least one of news, drama, art, and literature.

15. A network equipment, which is one of a Digital Subscriber Line (DSL) broadband access equipment, a Local Area Network (LAN) switch, a router and a layer-3 switch, and is capable of communicating with user equipments of multicast users, configured to:

preset mapping relations among multicast users, multicast authorities and multicast programs, wherein the multicast users are identified according to location information of connections between the multicast users and the network equipment, wherein the preset mapping relations comprise a first mapping relation between multicast programs and multicast authorities, the first mapping relation defining that each multicast authority corresponds to at least one multicast program that each refers to a multicast group address and a plurality of multicast programs are set in one multicast authority, wherein the preset mapping relations comprise a second mapping relation between multicast authorities and multicast users, the second mapping relation defining that at least one multicast user each corresponds to different multicast authorities and at least one multicast authority corresponds to many multicast users;

obtain a request packet from a user equipment of a given multicast user, the request packet carrying a multicast group address of a multicast group which the given multicast user requests to join in to utilize a multicast service;

determine address information of the given multicast user according to the request packet, the address information of the given multicast user depending on location information of a connection between the given multicast user and the network equipment;

determine whether the given multicast user corresponds to at least one multicast authority and whether the multicast group address carried in the request packet matches a multicast group address corresponding to the at least one multicast authority of the given multicast user according to the preset mapping relations;

if it is determined that the given multicast authority corresponds to the at least one multicast authority and that the multicast group address carried in the request packet matches a multicast group address corresponding to the at least one multicast authority of the given multicast user, permit the given multicast user to use the requested multicast service;

if it is determined that the multicast group address carried in the request packet does not match a multicast group address corresponding to the at least one multicast authority of the given multicast user, prohibit the multicast user from using the requested multicast service.

16. The network equipment according to claim 15, wherein the address information of the multicast user comprises a Virtual Local Area Network identifiers (VLAN ID) and/or a frame number, slot number and port number of the network equipment to which the multicast user is connected.

17. The broadband access equipment according to claim 16, wherein the broadband access equipment is a Digital Subscriber Line (DSL) broadband access equipment or a Local Area Network (LAN) switch; or a router or a layer-3 switch.

18. The network equipment according to claim 15, wherein the plurality of multicast programs are programs in a certain program category, the certain program category including at least one of news, drama, art, and literature.

* * * * *

UNITED STATES PATENT AND TRADEMARK OFFICE
CERTIFICATE OF CORRECTION

PATENT NO. : 7,830,825 B2
APPLICATION NO. : 10/590375
DATED : November 9, 2010
INVENTOR(S) : Yan Fu and Haitao Hu It is certified that error appears in the above-identified patent and that said Letters Patent is hereby corrected as shown below:

In Column 6, lines 45-47 (Claim 1, lines 10-12) which reads: "that at least one multicast authority corresponding each corresponds to many multicast users" should read --that at least one multicast authority each corresponds to many multicast users.--

Claim 17 should be cancelled.

Signed and Sealed this
Twenty-seventh Day of September, 2011

David J. Kappos
*Director of the United States Patent and Trademark Office*

UNITED STATES PATENT AND TRADEMARK OFFICE
CERTIFICATE OF CORRECTION

PATENT NO. : 7,830,825 B2
APPLICATION NO. : 10/590375
DATED : November 9, 2010
INVENTOR(S) : Yan Fu and Haitao Hu It is certified that error appears in the above-identified patent and that said Letters Patent is hereby corrected as shown below:

Delete the title page and substitute therefore the attached title page showing the corrected number of claims in patent.

In Column 6, lines 45-47 (Claim 1, lines 10-12) which reads: "that at least one multicast authority corresponding each corresponds to many multicast users" should read --that at least one multicast authority each corresponds to many multicast users.--.

Column 10, lines 24-28, Claim 17 should be cancelled.

This certificate supersedes the Certificate of Correction issued September 27, 2011.

Signed and Sealed this
Twenty-fifth Day of October, 2011

David J. Kappos
*Director of the United States Patent and Trademark Office*

CERTIFICATE OF CORRECTION (continued)

(12) United States Patent
Fu et al.

(10) Patent No.: US 7,830,825 B2
(45) Date of Patent: Nov. 9, 2010

(54) METHOD FOR REALIZING THE MULTICAST SERVICE

(75) Inventors: Yan Fu, Guangdong (CN); Haitao Hu, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 313 days.

(21) Appl. No.: 10/590,375

(22) PCT Filed: Mar. 24, 2005

(86) PCT No.: PCT/CN2005/000375

§ 371 (c)(1),
(2), (4) Date: May 16, 2007

(87) PCT Pub. No.: WO2005/091562

PCT Pub. Date: Sep. 29, 2005

(65) Prior Publication Data

US 2007/0253409 A1   Nov. 1, 2007

(30) Foreign Application Priority Data

Mar. 24, 2004   (CN)   .................. 2004 1 0030392

(51) Int. Cl.
*H04H 20/71*   (2008.01)
(52) U.S. Cl. .................. 370/312; 370/390; 370/473
(58) Field of Classification Search .................. 370/230,
370/252, 253, 310, 360, 389, 390, 392, 395.1,
370/395.21, 395.31, 395.52, 395.53, 400,
370/408, 420, 471, 473, 474, 475
See application file for complete search history.

(56) References Cited

U.S. PATENT DOCUMENTS 5,956,716 A * 9/1999 Kenner et al. .................. 707/10

(Continued)

FOREIGN PATENT DOCUMENTS

CN   1419363 A   5/2003

(Continued)

OTHER PUBLICATIONS

"A JINI/JAVA based streaming framework for group communication" Networks, 2002. ICON 2002. 10th IEEE International Conference on Aug. 27-30, 2002, Piscataway, NJ, USA, IEEE, Aug. 27, 2002, pp. 139-144, XP010603609 ISBN: 0-7803-7533-5.

(Continued)

*Primary Examiner*—Aung S Moe
*Assistant Examiner*—Benjamin Elliott

(57) ABSTRACT

The present invention discloses a method for implementing multicast services, which includes: preset a mapping relation between a multicast user address and a multicast group address; acquire a request packet sent by the multicast user who requests to join in the multicast group; determine whether the multicast group address in request packet is the same as that corresponding to the multicast user in the established mapping relation according to the multicast user address and multicast group address carried in the request packet. If yes, allow the multicast user to join in the multicast group. Otherwise, prohibit the multicast user from joining in the multicast group. The present invention can open the preset multicast resources to the preset multicast user with speed and pertinence. At the same time, it limits the maximum number of multicast groups that each multicast user is allowed to join in, which can effectively control multicast service bandwidth and further protect the network equipment.

17 Claims, 2 Drawing Sheets